Inventor:
Erwin James Masek

Patented Feb. 12, 1946

2,394,708

UNITED STATES PATENT OFFICE 2,394,708

THERMOSTAT CIRCUIT

Erwin James Masek, Chicago, Ill., assignor to Vapor Car Heating Company, Inc., Chicago, Ill., a corporation of New York Application May 20, 1942, Serial No. 443,778

7 Claims. (Cl. 236—68)

This invention relates to an improved thermostat circuit, that is a circuit that is made and broken by a thermostat in response to temperature changes in a predetermined space, the circuit usually functioning in some manner to control a means for heating the air within the space.

The practice is already known of controlling a circuit by means of a thermostat in response to atmospheric temperature changes, the thermostat response also being varied or supplemented by heat from an auxiliary heating coil associated with the thermostat so as to increase the effective temperature to which the thermostat responds. Heretofore this action has been accomplished by the use of a relay cooperating with the thermostat. This relay not only makes and breaks the main circuit in accordance with the dictates of the thermostat but also makes and breaks an energizing circuit for the auxiliary heating coil.

The main object of this invention is to simplify a circuit of this type by eliminating the use of the relay.

Another object is to prevent destructive sparking at the thermostat contacts by the use of a non-inductive resistance connected in parallel with the main working resistance in the circuit.

Other objects and advantages of this invention will be more apparent from the following detailed description of certain approved forms of apparatus constructed and operating according to the principles of this invention.

Figure 1:
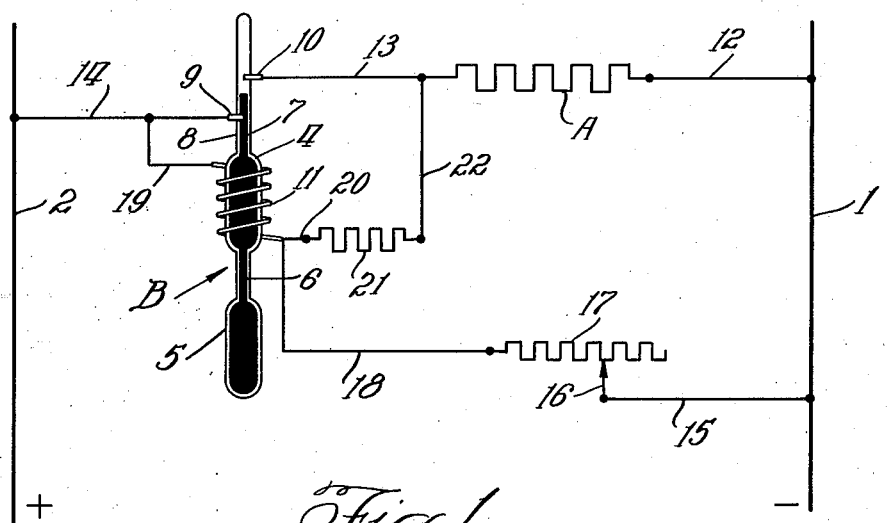
Fig. 1 is a wiring diagram illustrating the general principles of this invention.
Figure 2:
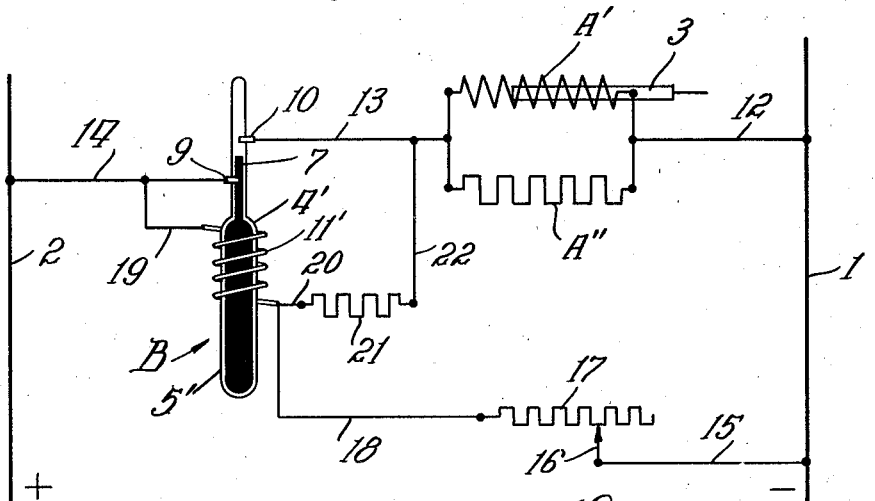
Fig. 2 is a similar diagram showing the modification.

Referring first to Fig. 1, at A is indicated a main resistance, in this example the resistance A being an electric heater for a heat-motor which actuates a valve. Referring for a moment to Fig. 2, the solenoid resistance indicated at A' acts, when energized, to draw in the core 3 and thereby open or close a valve or perform some similar function. In either instance this main resistance will be hereinafter referred to as a "working resistance" to indicate that this resistance performs some useful work other than merely limiting or retarding the flow of current through the circuit.

Referring again to Fig. 1, the resistance A is located in a circuit which extends between the mains 1 and 2 and is completed or broken by the thermostat, indicated generally at B. This thermostat is here shown as being of the mercury-column type comprising an upper bulb 4 and a lower bulb 5 connected by the lower stem portion 6. The mercury column 7 extends upwardly from bulb 4 through the main stem 8 in which a contact 9 is always in engagement with the mercury column 7. The mercury column also engages an upper contact 10 at a predetermined higher temperature. The mercury in the lower bulb 5 is responsive to changes in the surrounding atmospheric temperature whereas the mercury in the upper bulb 4 is additionally heated by the surrounding electric coil 11. If the thermostat B is designed to function at 75° (for example) and the existing atmospheric temperature in the space being heated is 70°, if 5° of heat is added by the coil 11, the upper contact 10 will be engaged by the mercury column 7 at 75°. When the thermostat B has thus been satisfied, a main actuating circuit will be completed as follows: From main 1 through wire 12, resistance A, wire 13, contact 10, mercury column 7, contact 9 and wire 14 to the other main 2. If the temperature to which thermostat B responds falls below this predetermined temperature, the circuit will be broken at 10 and the heater A will no longer be energized.

The auxiliary heating coil 11 is constantly energized through a circuit extending from main 1, through wire 15, movable contact 16 of the adjustable resistance 17, and wire 18 to one end of the coil 11. The other end of coil 11 is connected through wires 19 and 14 with the other main 2. When thus energized the coil 11 will impart a certain amount of heat to the thermostat which, added to the prevailing atmospheric temperature, will determine the temperature at which thermostat B will function, that is the temperature at which the upper contact 10 will be engaged by the mercury column 7. By suitably adjusting the movable contact 16 of the adjustable resistance 17 the normal functioning temperature of the thermostat may be selectively adjusted.

The first mentioned end of auxiliary heating coil 11 is also connected through wire 20, resistor 21, and wire 22, with the main circuit wire 13. An additional flow of current through coil 11 is thus provided, to further lower the functioning temperature of thermostat B, when the thermostat contacts 7 and 10 are separated and the main operating circuit is broken at the thermostat. A current will now flow from the main 1 through wire 12, main resistance A, wire 22, resistor 21, wire 20, heating coil 11, and wires 19 and 14 to the main 2. This current will not be sufficiently strong to cause an effective operation by the main resistance A, but the current will be sufficient to add an appreciable amount of heat to the thermostat B by means of the auxiliary heater 11. This additional heat will cause the mercury column 7 to rise again until contact is made with the upper contact 10 and the main circuit completed so as to short-circuit the auxiliary coil 11 and the resistor 21, and the increased flow of current through the main resistance A will again cause an effective operation of the heat-motor with the result that the main control valve will be partially closed and the supply of heat to the space in which the thermostat B is located will be cut down. As a result the mercury column 7 will again fall and the main circuit will be again broken at 10.

This will materially de-energize the resistance A, but the heater 11 will again be energized to cause another cycling operation of the thermostat which will again complete the circuit at 10. It will thus be seen that the thermostat B will "cycle," that is move up and down so as to successively make and break the main operating circuit, and it will furthermore be seen that this cycling operation is performed by the thermostat itself without the assistance of any cooperating relay.

The circuit shown in Fig. 2 is in many respects identical with the one hereinabove described in connection with Fig. 1. However, in this case the thermostat B is shown as comprising only a single bulb 4' to a portion of which the coil 11' is applied. It is immaterial, in either Figs. 1 or 2, whether one or two bulbs are used as long as at least a portion of the bulb, such as 5', is left entirely exposed to atmospheric temperature changes. As already described, the solenoid coil A' is used in Fig. 2 instead of the heating coil A, shown in Fig. 1. This solenoid A' operates to draw in the core 3 and operate a heat-controlling valve. It will be understood that when the actuating current is broken at the contacts 7 and 10 a current will be induced in the coil A' which will tend to cause destructive sparking at the thermostat contacts. In order to minimize this undesirable operation, a non-inductive resistor A'' is connected in the main circuit in parallel with the working resistor A' (preferably directly across the ends thereof) as shown in Fig. 2. This resistor A'' should preferably have about the same resistance value as the main coil A'. When current is flowing normally through the main circuit the resistor A'' serves simply to double the load, that is only half of the total current is useful in operating the working resistance A'. However, when the main current is broken at the thermostat, the voltage thereby induced in coil A' will be mostly taken care of by the shunted resistor A'' so that the effective current in the main circuit will be greatly reduced and there will be substantially no arc created at the thermostat contacts.

While this circuit system has been disclosed in connection with a mercury-tube thermostat, it will be understood that other types of thermostats, for example a bi-metallic thermostat, might be used, and other auxiliary electric heating means could be employed instead of the simple heating coil herein shown.

The adjustable resistance 17, or its equivalent, is not essential to the operation unless an adjustable thermostat is required.

I claim:

1. In combination with an electric circuit, a working resistance in said circuit, a thermostat in the circuit responsive to temperature changes and acting to complete the circuit at a certain temperature and break the circuit below this temperature, and an electric heater adjacent the thermostat to add heat thereto, a resistor of greater resistance than the working resistance in series with the electric-heater, said heater and resistor being shunted around the thermostat and connected in series with the first resistance.

2. In combination with an electric circuit, a working resistance in said circuit, a thermostat in the circuit responsive to temperature changes and acting to complete the circuit at a certain temperature and break the circuit below this temperature, and an electric heater adjacent the thermostat to add heat thereto, an energizing circuit which is constantly effective to supply electric current to said electric heater, an adjustable resistance therein for controlling the flow of electric current through said energizing circuit for the electric heater, said heater also being connected in a parallel branch of the first mentioned circuit shunted around the thermostat and in series with said working resistance.

3. In combination, a mercury-tube thermostat responsive to temperature changes and comprising a mercury column and a pair of spaced apart contacts, a main circuit comprising two branches extending from the respective contacts so that the circuit will be completed through the mercury column at and above a predetermined temperature, a working resistance in the main circuit, a heating coil adjacent the thermostat to add heat thereto, a resistor of greater resistance than said working resistance in series with the heating coil, said coil and resistor being shunted around the thermostat and connected in series with the first resistance.

4. In combination, a mercury-tube thermostat responsive to temperature changes and comprising a mercury column and a pair of spaced apart contacts, a main circuit comprising two branches extending from the respective contacts so that the circuit will be completed through the mercury column at and above a predetermined temperature, a working resistance in the main circuit, a heating coil associated with the thermostat to add heat thereto, an energizing circuit for said heating coil, an adjustable resistance therein for adjusting the energizing circuit, said heating coil also being connected in a parallel branch of the main circuit shunted around the thermostat and in series with said working resistance.

5. In combination, a mercury-tube thermostat responsive to temperature changes and comprising a mercury column and a pair of spaced apart contacts, a main circuit comprising two branches extending from the respective contacts so that the circuit will be completed through the mercury column at and above a predetermined temperature, a working resistance in the main circuit, a heating coil associated with the thermostat to add heat thereto, an energizing circuit for said heating coil, an adjustable resistance therein for adjusting the energizing circuit, a resistor in series with the heating coil, said heating coil and resistor also being connected in a parallel branch of the main circuit shunted around the thermostat and in series with said working resistance.

6. In combination, a mercury-tube thermostat responsive to temperature changes and comprising a mercury column and a pair of spaced apart contacts, a main circuit comprising two branches extending from the respective contacts so that the circuit will be completed through the mercury column at and above a predetermined temperature, a working resistance in the main circuit, a non-inductive resistance connected in parallel with said working resistance, a heating coil adjacent the thermostat to add heat thereto, the intensity of the energization of said coil being increased and decreased by a circuit shunted around the thermostat contacts and in series with the working resistance and a cycle resistor of greater resistance than the working resistance interposed in the last mentioned circuit between the said coil and the working resistance.

7. In combination with an electric circuit, a working resistance in said circuit, a thermostat in the circuit responsive to temperature changes to make and break said electric circuit, an electric heater for adding heat to the thermostat, an energizing circuit which is constantly effective to supply electric current of predetermined volume to said electric heater, said electric heater being also connected in a parallel branch of the first mentioned circuit shunted around the thermostat and adapted to supply an additional volume of electric current to said heater when the first mentioned circuit is opened at the thermostat.

ERWIN JAMES MASEK.